US009774200B2

(12) United States Patent
Todd et al.

(10) Patent No.: US 9,774,200 B2
(45) Date of Patent: Sep. 26, 2017

(54) APPARATUS, METHOD, AND SYSTEM FOR SECURELY CHARGING MOBILE DEVICES

(71) Applicants: Emory Todd, Atlanta, GA (US); Kristen Todd Gaeta, Palm Beach Gardens, FL (US)

(72) Inventors: Emory Todd, Atlanta, GA (US); Kristen Todd Gaeta, Palm Beach Gardens, FL (US)

(*) Notice: Subject to any disclaimer, the term of this patent is extended or adjusted under 35 U.S.C. 154(b) by 160 days.

(21) Appl. No.: 14/731,939

(22) Filed: Jun. 5, 2015

(65) Prior Publication Data

US 2016/0359349 A1 Dec. 8, 2016

(51) Int. Cl.
*H02J 7/00* (2006.01)
*G06K 9/00* (2006.01)

(52) U.S. Cl.
CPC ........ *H02J 7/0044* (2013.01); *G06K 9/00006* (2013.01); *H02J 7/00* (2013.01); *H02J 2007/0001* (2013.01)

(58) Field of Classification Search
CPC .................................................... H02J 7/0044
USPC ........................................................ 320/114
See application file for complete search history.

(56) References Cited

U.S. PATENT DOCUMENTS

| 6,212,410 | B1 | 4/2001 | Ishida |
| 8,155,697 | B2 | 4/2012 | Harris |
| 8,467,770 | B1* | 6/2013 | Ben Ayed ............. H04L 63/107 455/41.1 |
| 8,539,590 | B2 | 9/2013 | Lee et al. |
| 8,547,059 | B2 | 10/2013 | Kurumizawa et al. |
| 8,718,717 | B2 | 5/2014 | Vaknin et al. |
| 8,723,642 | B2 | 5/2014 | Park et al. |
| 9,100,493 | B1* | 8/2015 | Zhou ................. H04M 1/72522 |
| 9,195,817 | B2* | 11/2015 | Scully-Power ......... G06F 21/32 |
| 9,411,386 | B2* | 8/2016 | Sauerwein, Jr. ........ G06F 21/00 |
| 9,436,220 | B2* | 9/2016 | Rosenberg ............ G06F 1/1632 |
| 9,501,881 | B2* | 11/2016 | Ahmad .............. G07C 9/00087 |
| 9,613,282 | B2* | 4/2017 | Weiss ................. G07C 9/00158 |
| 2005/0263596 | A1 | 12/2005 | Nelson et al. |
| 2011/0140656 | A1 | 6/2011 | Starr et al. |
| 2012/0299547 | A1 | 11/2012 | Lee et al. |

FOREIGN PATENT DOCUMENTS

| JP | 2006-279844 A | 10/2006 |
| JP | 2013-110953 | 6/2013 |
| JP | 2015-8524 A | 1/2015 |

(Continued)

OTHER PUBLICATIONS

Notification of Transmittal of the International Search Report and the Written Opinion of the International Searching Authority dated Aug. 30, 2016, in connection with corresponding International Application No. PCT/US2016/035702 (12 pgs.).

(Continued)

*Primary Examiner* — M'Baye Diao
(74) *Attorney, Agent, or Firm* — Maier & Maier, PLLC

(57) ABSTRACT

A secure mobile device charger for charging batteries of mobile devices. The secure mobile charger can include a body housing battery charging elements; a power connector; a mobile device connector; a biometric sensor that reads biometric input data; and a switch that prevents unauthorized battery charging from the mobile device connector.

10 Claims, 5 Drawing Sheets

(56) References Cited

FOREIGN PATENT DOCUMENTS

KR    10-2015-0047050 A    5/2015

OTHER PUBLICATIONS iCharger Lock Press; Local Family's Frustration Sparks New Invention; Apple iPhone Charger lock; http://www.ichargerlock.com/#!press/cgbd; 3 pages.

Donny Jacob Ohana, et al; Preventing Cell Phone Intrusion and Theft Using Biometrics; Fingerprint Biometric Security Utilizing Dongle and Solid Relay Technology; 2013 IEEE Security and Privacy Workshops; pp. 173-180.

* cited by examiner

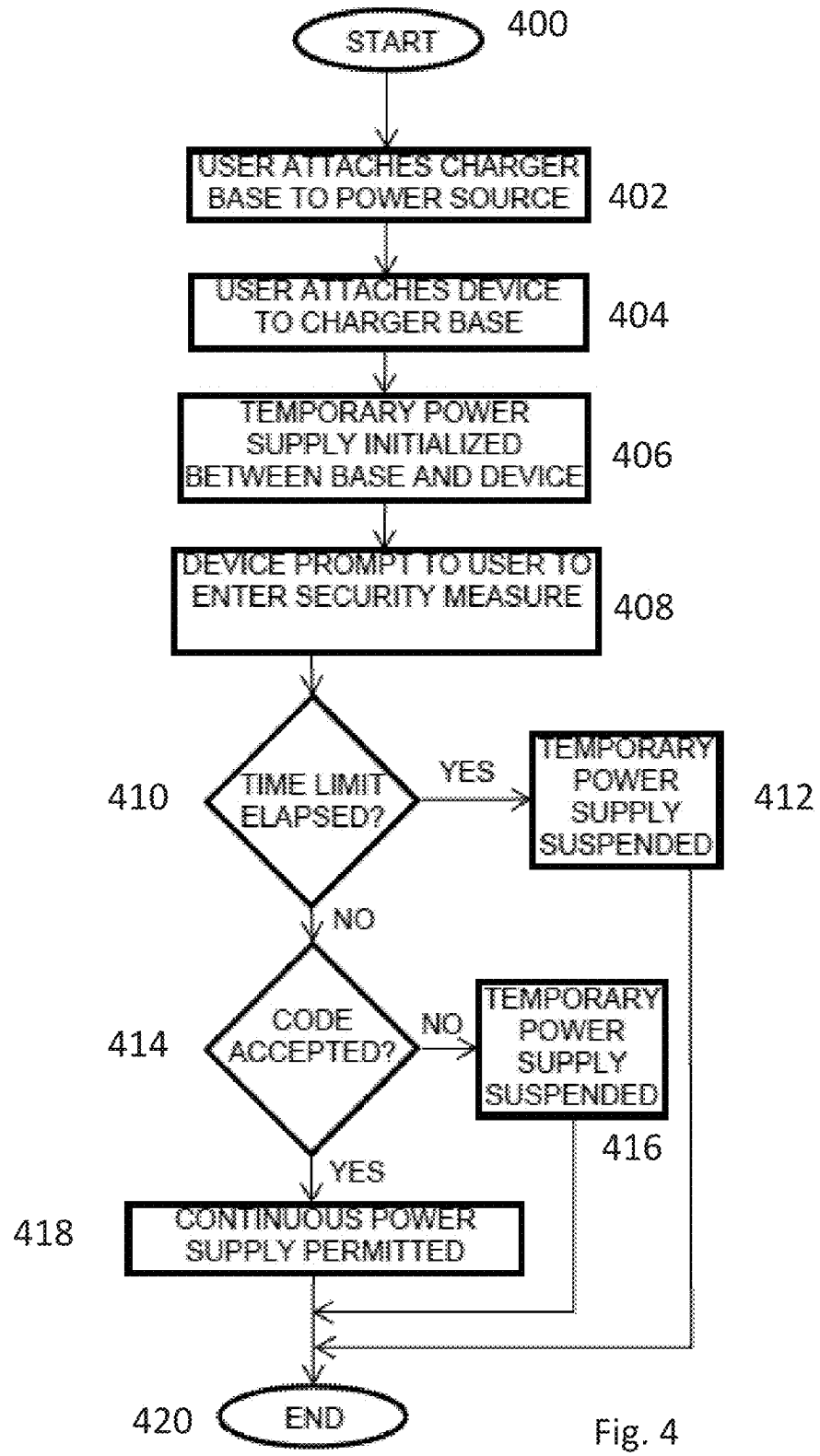

APPARATUS, METHOD, AND SYSTEM FOR SECURELY CHARGING MOBILE DEVICES

BACKGROUND

Mobile communication devices, and other mobile electronic devices, are commonly used in almost every environment. The mobile devices can be phones, smart phones, tablets, tablet-phones, computers, and the like, and may provide their users with any of a variety of capabilities. Although many mobile communication devices provide telephone capabilities, they are relied on more frequently for internet access, social media access, email access, video and audio downloading and playback capabilities, and other properties in work and entertaining environments.

The myriad capabilities of such mobile communication devices utilize various amounts of power. Although battery technology is consistently being improved, the battery life of a mobile communication device can dictate its usefulness or effectiveness. Additionally, although some capabilities of mobile communication devices are known as battery friendly, such as audio or music playback and Wifi internet usage, others require significantly more power consumption by the mobile communication device. For example, data network usage (such as EDGE, 3G, 4G, LTE, and the like), video playback, video recording, and social media access and social media gaming often utilize a wide variety of a mobile communication device's processing and power capabilities, providing a shorter useful life of the mobile communication device until it needs to be recharged.

Recharging mobile communication devices is then an issue because the environments where they are often plugged in and recharged are not typically secure environments. As mobile communication devices are frequently used outside of home and office environments, charging solutions are often sought by users. Users often have charging devices with them, but often fear theft of the charging device or other people simply unplugging their mobile communication device and using it with another device. Also, in some locations, such as airports and coffee shops, recharging stations are often provided for consumer use. However, mobile communication devices typically take a substantial amount of time to recharge and, in order to prevent removal, unauthorized access, or theft of their mobile communication device, users must monitor or be physically present or proximate to the charging stations or other locations that are being used to charge the mobile communication devices. Thus it is desired to provide a manner of securely charging a mobile communication device that provides a user with additional security.

SUMMARY

In one exemplary embodiment, a secure mobile device charging device may be shown and described. The secure mobile device charger can have a body housing battery charging elements; a power connector; a mobile device connector; a biometric sensor that reads biometric input data; and a switch that prevents unauthorized battery charging from the mobile device connector.

In another exemplary embodiment, a system for charging a mobile communication device may be shown and described. This exemplary embodiment may include a mobile communication device; a power source; a cord; and a mobile communication device charger. The charger may further have a body housing battery charging elements; a power connector; a mobile device connector; a biometric sensor that reads biometric input data; and a switch that prevents unauthorized battery charging from the mobile device connector.

In still another exemplary embodiment, a method for having a secure mobile device charger may be shown and described. The method can include connecting a battery charging device to a power source; connecting a mobile device to the battery charger; supplying, temporarily, power to the mobile device from the battery charger; prompting input of biometric information on a biometric sensor on the battery charger; inputting biometric information on the biometric sensor; comparing the inputted biometric information with stored, authorized biometric information; providing continuous power from the battery charger to the mobile device when the inputted biometric information is authorized; and ceasing the temporary supply of power from the battery to the mobile device when the inputted biometric information is not authorized.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 4 is an exemplary decision tree associated with a secure mobile communication device battery charger.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, and generally referring to FIGS. 1-6, a secure mobile device battery charger, system, and method for using may be shown and described. The secure mobile device battery charger may be utilized with any of a variety of mobile devices, as described herein. The secure mobile device battery charger may be such that it can provide battery charging, or other power capabilities, based on a desired input or entry of a security code. The secure mobile device battery charger can further prevent unauthorized or undesired devices from being charged while connected to the secure mobile device battery charger.

Figure 1A:
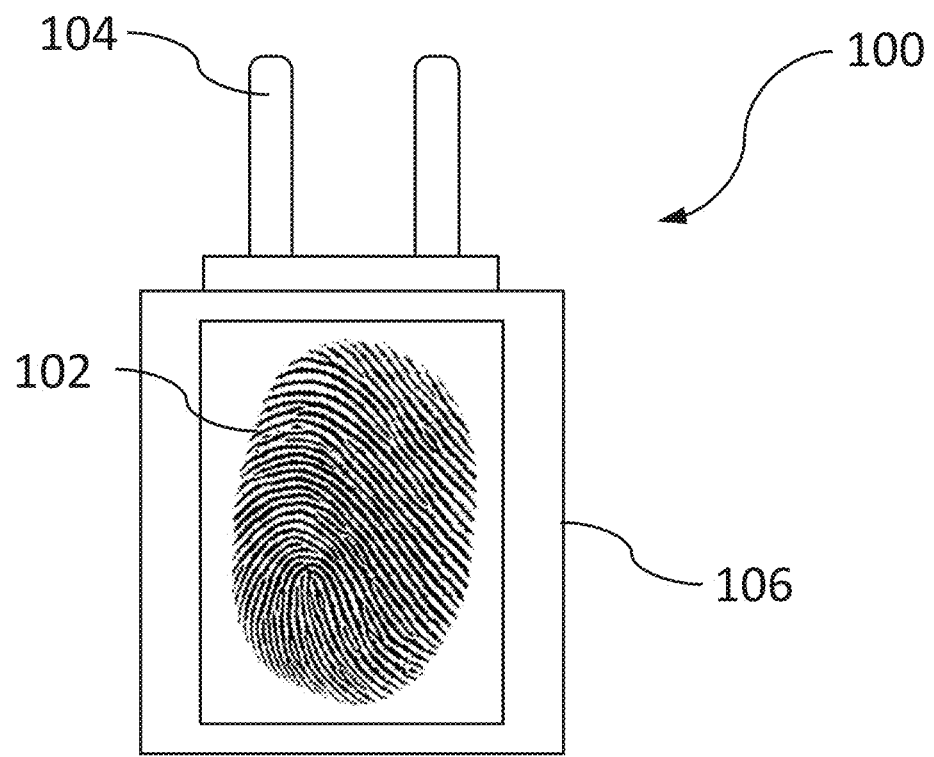
FIG. 1A is an exemplary view of a secure mobile communication device battery charger.
Figure 1B:
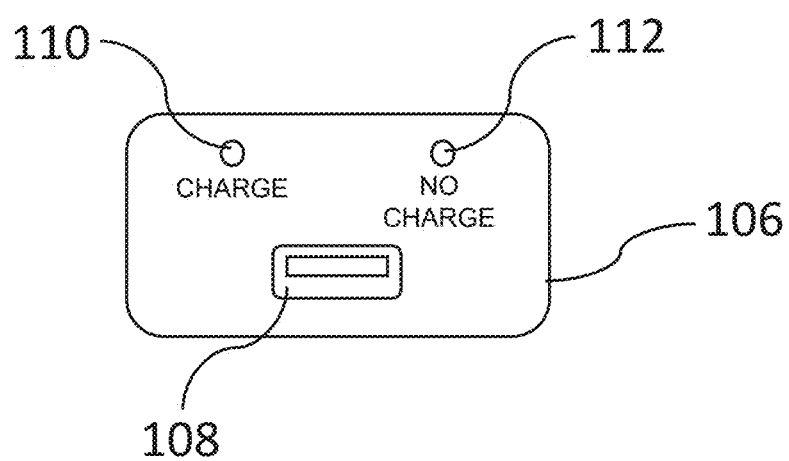
FIG. 1B is another exemplary view of a secure mobile communication device battery charger.

In exemplary FIGS. 1A and 1B, and in one embodiment, a mobile communication device charger 100 may be shown and described. The mobile communication device charger 100 may include any of a variety of components and functionality. For example, the mobile communication device charger 100 can include an integrated biometric sensor 102, or another input sensor or component, which may allow for the input of data. In this exemplary embodiment, the charger 100 may be a charger usable with any type of mobile device including, but not limited to, mobile phones, tablets, portable computers, laptop computers, mobile audio and/or video devices, and the like. It may be appreciated that the charger 100 can be connected to AC power, a USB port, or the like, by power connector 104. In exemplary FIGS. 1A and 1B, power connector 104 is shown as a plug with a pair of prongs. However, in other exemplary embodiments, power connector 104 may be a cable, cord, USB dongle, micro-USB dongle, or any other proprietary or non-proprietary power connector or power-capable connector that may be coupled to a power source. The charger 100 may further have a body portion 106 and a mobile device connector 108. The mobile device connector 108 may be a port that allows a cable (not pictured) to be connected to the mobile device connector 108. A port used as mobile device connector 108 may be a USB port, micro-USB port, AC port, headphone port, or any other connector capable of communicatively coupling, and provide power to, a mobile communication device. Additionally, although the term "mobile communication device" is used in various parts of this description, it should be appreciated that any mobile device or electronic device may be utilized with charger 100. For example, a USB cord may be connected from a mobile communication device to the mobile communication device charger 100 via mobile device connector 108. In this example the USB cord may have a first end that is connected to the body 106 of mobile communication device charger 100 through mobile device connector 108 and a second end that is connected directly to the mobile communication device.

It may further be appreciated that body 106 may house any charging elements or components (not pictured) for providing charging capabilities from charger 100 to a device connected thereto. For example, housed in body 106 may be a transformer, for example, to convert high voltage to low voltage. It may further include a rectifier that can convert AC voltage from the transformer to DC voltage. Body 106 may further have a filter, which may provide for capacitive filtering, to filter the DC voltage into a smooth, usable output. Body 106 may further include a regulator that can remove irregularities and inconsistencies from the output signal in order to provide a desired output to charge a mobile device.

In some other exemplary embodiments, it may be appreciated that mobile communication device charger 100 may communicate with a mobile communication device through wireless transmission. In such exemplary embodiments, mobile communication device charger may include a Wi-Fi transmitter, data network transmitter (such as, but not limited to, EDGE, 3G, 4G, 5G, LTE, and the like), modem, or any other device that may communicate data to and from the mobile communication device charger 100 and which may be housed in body 106. Additionally, it may be appreciated that mobile communication device charger 100 may communicate in a wired or wireless fashion with any of a variety of devices. Such communications can take place between the mobile communication device charger 100 and a mobile communication device to be charged, multiple mobile communication devices to be charged, a remotely located server, or the like.

In still other exemplary embodiments, it may be appreciated that wireless power transmission may be utilized with the mobile communication device charger 100. In such an exemplary embodiment, the body 106 of mobile communication device charger 100 may be formed as a pad, as utilized for wireless power transmission, or may take any other appropriate form. Wireless power transmission may then be effected through use of inductive coupling, resonant inductive coupling, capacitive coupling, or any other wireless power transmission methodology. Wireless data transmission may still be accomplished through any of the manners described herein.

Still referring to exemplary FIGS. 1A and 1B, the body 106 of the charger 100 can have a biometric device 102 mounted thereon. The biometric device 102 may be such that it can read biometric data to provide or deny access or capabilities associated with the charger 100. For example, the biometric device 102 may be coupled to or capable of actuating a locking mechanism or lockout capabilities associated with the charger 100. Such capabilities can include, but are not limited to, providing power or charging capabilities to an authorized mobile device or authorized user, transmitting an accepted message to an authorized device or unauthorized device regarding access to the charger 100, denying power or preventing charging of an unauthorized device, data and/or communication transmissions to and from a remote server, communicating with a software application on a mobile communication device, and the like. For example, if unauthorized use or unauthorized biometric data is inputted into charger 100 or biometric sensor 102, a switch embedded in biometric sensor may deactivate the charger or otherwise prevent use. The switch may be any type of switch, for example a software switch, data switch, mechanical switch, or the like. In some alternative exemplary embodiments, mobile communication device charger 100 may also have capabilities to actively couple the charger 100 to a mobile communication device and prevent its removal, or deny access to mobile device connector 108 until authorized access is made via biometric sensor 102.

In still a further exemplary embodiment, the biometric sensor 102 may be any type of biometric device. For example, the biometric sensor 102 can be a fingerprint reader or sensor, as shown in exemplary FIGS. 1A and 1B. Alternatively, the biometric device could be a finger vein scanner, retinal scanner, or the like. Thus, a user may put his or her finger (or other appropriate body part) in a sensing area of the biometric sensor 102. The biometric sensor 102 may then sense or detect if the body part being scanned is appropriate. It may be appreciated that the charger 100 may include storage, such as memory, and processing capabilities, such as a processor, which may store desired biometric data and allow comparisons to be made to determine if appropriate biometric data is being inputted through the biometric sensor 102. In other exemplary embodiments, the charger body 106 may have communication capabilities, such as a transmitter, that transmits data, in a wired or wireless fashion to an outside processor associated with a database in order to determine if appropriate biometric data is being sensed or otherwise inputted through biometric sensor 102.

In a further exemplary embodiment, and still referring to exemplary FIGS. 1A and 1B, indicators 110 and 112 may be on a front face of body 106 of mobile communication device charger 100. Indicators 110 and 112 may be positioned proximate mobile device connector 108, or may be located on any other portion of body 106, as desired. Indicators 110 and 112 may be LEDs or any other type of light or indicator, as desired. In one example, a first indicator 110 may be lit when charger 100 is in a state where charging of a device is authorized. This may be in situations where appropriate or authorized access has been provided through biometric sensor 102. Alternatively, first indicator 110 may be lit when charger 100 is in a state where access or charging capabilities are available without entry of any biometric data or other access information.

Figure 2:
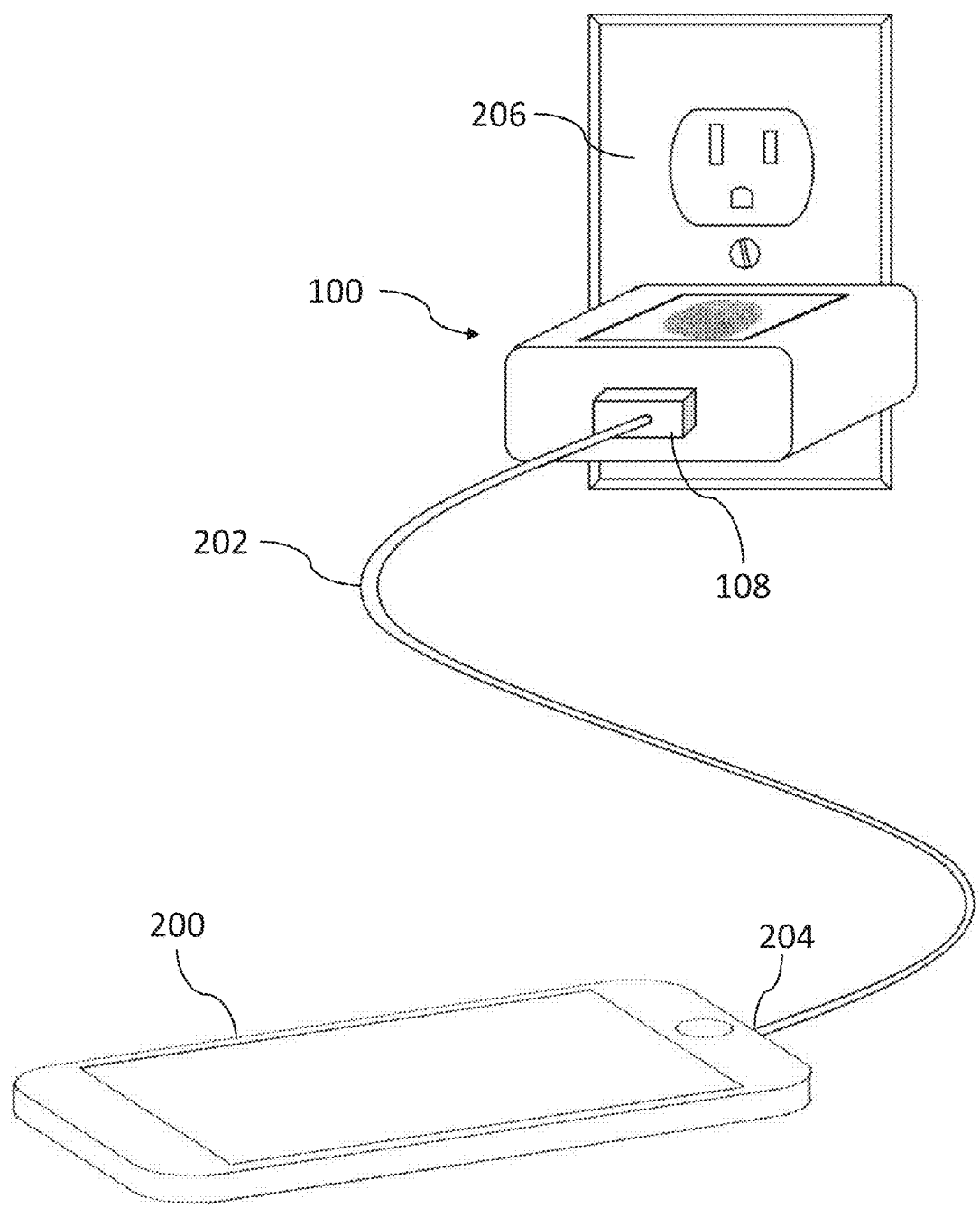
FIG. 2 is an exemplary view of a mobile communication device coupled with a secure mobile communication device battery charger.

Referring now to exemplary FIG. 2, further embodiments of a secure mobile device charger 100 may be shown and described. In this example charger 100 may be communicatively coupled to a mobile device, such as a mobile phone 200. The communicative coupling between phone 200 and charger 100 may be accomplished using cord 202. Cord 202 may be any type of cord, for example a cord associated with a USB. Cord 202 may further be connected to phone 200 via port 204, which may be any type of port capable of providing a couple between cord 202 and phone 200. In different exemplary embodiments, phone 200 and charger 100 then initiate charging, communication, or have different actions take place.

In one exemplary embodiment, charger 100 may be connected to a power source 206 by prongs 104. Then, after charger 100 is connected to phone 200, indicator 112 may indicate that charger 100 is not active or that it will not provide charging capabilities to phone 200. Alternatively, charger 100 may provide or act as a temporary power supply to charge phone 200. Such temporary or inactive charging capabilities may be utilized when charger 100 has not been properly activated or accessed. In such circumstances, indicator 112 may indicate that charger 100 is in a temporary charging mode or an inactive or standby mode. It may be appreciated that when charger 100 is in a temporary charging mode, charger 100 may provide power for a predetermined amount of time, for example the amount of time desired to prompt and have a user enter in biometric information or data. Alternatively, charger 100 may be in a temporary active state for a period of 30 seconds, 1 minute, etc.

After charger 100 is connected with phone 200, biometric sensor 102 may also be activated. In some exemplary embodiments, charger 100 may also be connected to a power source 206 via prongs 104 and it can be appreciated that charger 100 may be connected to a power source 206 when discussing the various exemplary embodiments described herein. Biometric sensor 102 may be activated and provide any of a variety of indications that it is active. For example, biometric sensor 102 may have a backlit pad that illuminates when it is active. Alternatively, an audible alert may be issued from a speaker on body 106 of charger 100. In still further examples, a message may be shown on phone 200 that indicates biometric sensor 102 is active and which further prompts a user to use biometric sensor 102 to fully activate charger 100. A message on phone 202 may further provide instructions to a user on how to use charger 100 and how to otherwise interface with biometric sensor 102.

Figure 3:
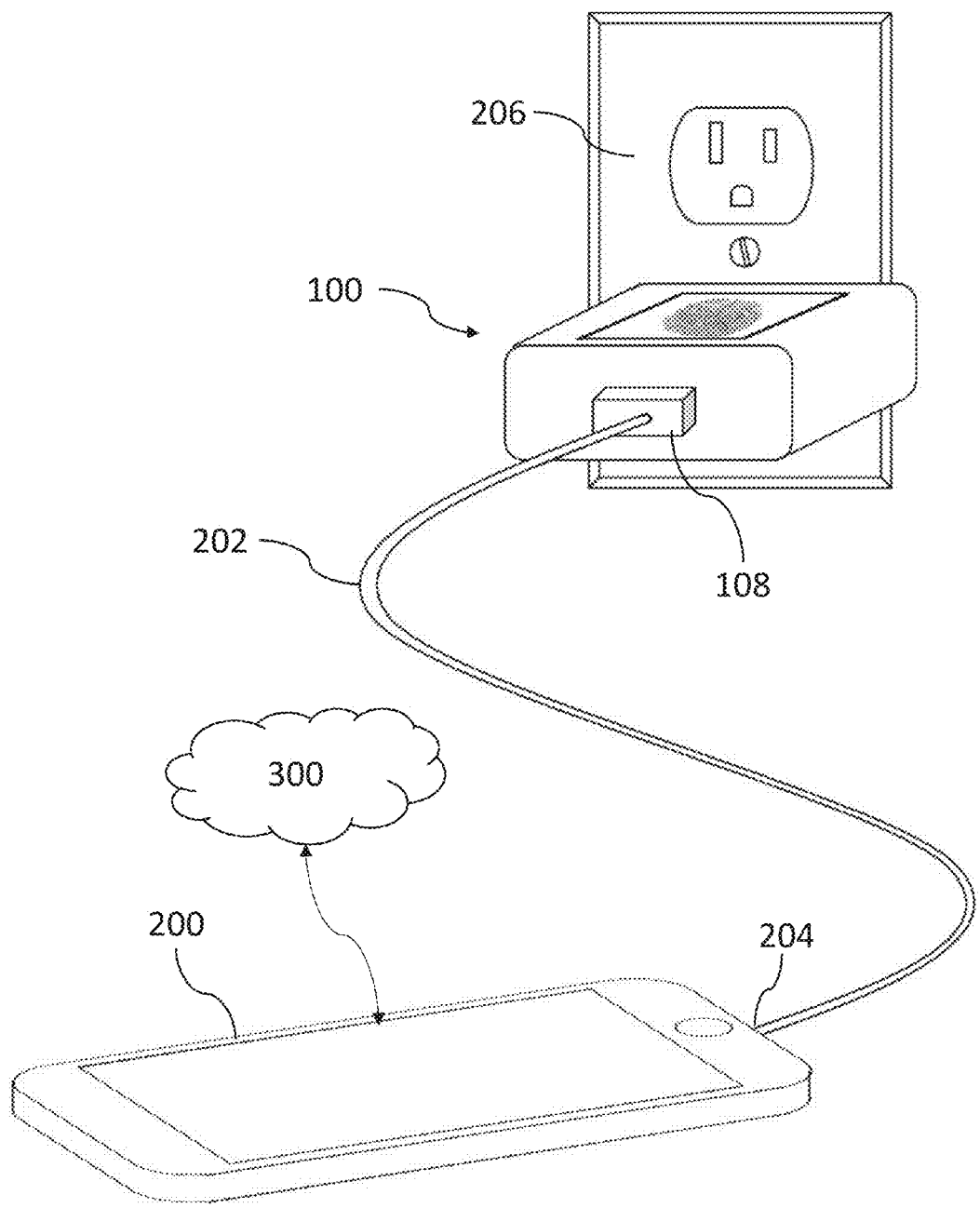
FIG. 3 is an exemplary view of a mobile communication device coupled with a secure mobile communication device battery charger.

Exemplary FIG. 3 can provide another embodiment of secure charger 100. Here, as in exemplary FIG. 2, charger 100 is coupled with phone 200 via cord 202, as described above. Further, a user may be attempting to charge phone 200 using charger 100. Thus, in this exemplary embodiment, a user may attempt to enter biometric information via biometric sensor 102, for example by pressing his or her finger on biometric sensor 102. Biometric sensor 102 may then obtain the biometric data, for example fingerprint data, and compare it with known fingerprint data, such as fingerprint data associated with an authorized user or users of charger 100. After obtaining biometric data, biometric sensor 102 may compare the biometric data with one or more sets of accepted biometric data. For example, a user may have previously set up charger 100 to accept only his or her fingerprint as a way of accessing the charging capabilities of charger 100. This information may be stored in any of a variety of locations, for example a remotely located or cloud based memory 300, a memory on phone 200, or on a memory in charger 100. It may be appreciated that charger 100 can communicate with cloud based memory 300 through wireless data transmission, as otherwise discussed herein. Additionally, charger 100 can communicate with phone 200 in any wired or wireless fashion, as desired. Biometric sensor 102 may communicate with any of these items, as well as a processor associated with any of memory 300, phone 200, or charger 100 in order to compare the inputted biometric data with known or authorized biometric data. If the biometric data inputted into biometric sensor 102 is authorized, charger 100 may activate or enable certain capabilities, such as the ability to charge mobile phone 200, and indicator 110 may illuminate (or provide some other type of alert) that charger 100 is active.

Alternatively, in some other exemplary embodiments, if the biometric data inputted into biometric sensor 102 is compared by a processor with biometric data in a memory and determined to be unauthorized biometric data, or otherwise not recognized biometric data, charger 100 may remain in a standby state, may deactivate any charging capabilities, or otherwise prevent unauthorized users or devices from charging using charger 100. It may be appreciated that such unauthorized access may be accompanied by a notification on the mobile device of the unauthorized user. Additionally, a notification may be transmitted to an authorized user's device indicating that another party attempted to access the charging capabilities of charger 100. Alternatively, when the authorized device is reconnected to charger 100, charger 100 may transmit a message about the unauthorized access at that time.

In another exemplary embodiment, and referring now to FIG. 4, a method for providing charging capabilities or power to an electronic device, such as a mobile device, may be shown and described. Here, in 400 a mobile device charger may be presented and, at 402, the mobile device charger may be connected to a power source, such as a power outlet or other device that can supply electricity. Then, in 404, a device may be attached or coupled to the charger. Following this, in 406, power may be temporarily supplied from the charger to the mobile device it is connected to. As described in other exemplary embodiments, this power may be delivered for a set amount of time or any other increment, as desired.

Still referring to exemplary FIG. 4, after the device is connected to the charger and power is temporarily supplied, in 408 the device may prompt a user to enter a security measure. As discussed in examples herein, the security measure may be biometric information entered via a biometric sensor. However, in other exemplary embodiments, the security measure could be a number, such as a four digit code or the like, password, or any other security measure, as desired. In 410, the charger (or a processor associated with the charger) may determine that the predetermined amount of time has elapsed. In such cases, in 412, the temporary power would be suspended or cut off and the charger would be deactivated. Alternatively, if, in 410, the predetermined time has not run out, a user may still enter a security measure, as prompted in step 408.

In 414, if an improper security measure is supplied to the charger, the temporary power will be suspended, as shown in 416. This can be done by any desired form of comparison done with a processor and memory, as described herein. Alternatively, if a security measure is reviewed by the charger and accepted, in 418 the charger may be fully activated and continuous, uninterrupted power may be supplied to the device. Power may then be supplied, or the charger will remain inactive, depending on the above-described circumstances, until 420 when the device is disconnected from the charger or the charger is otherwise disconnected from a power supply.

Figure 5A:
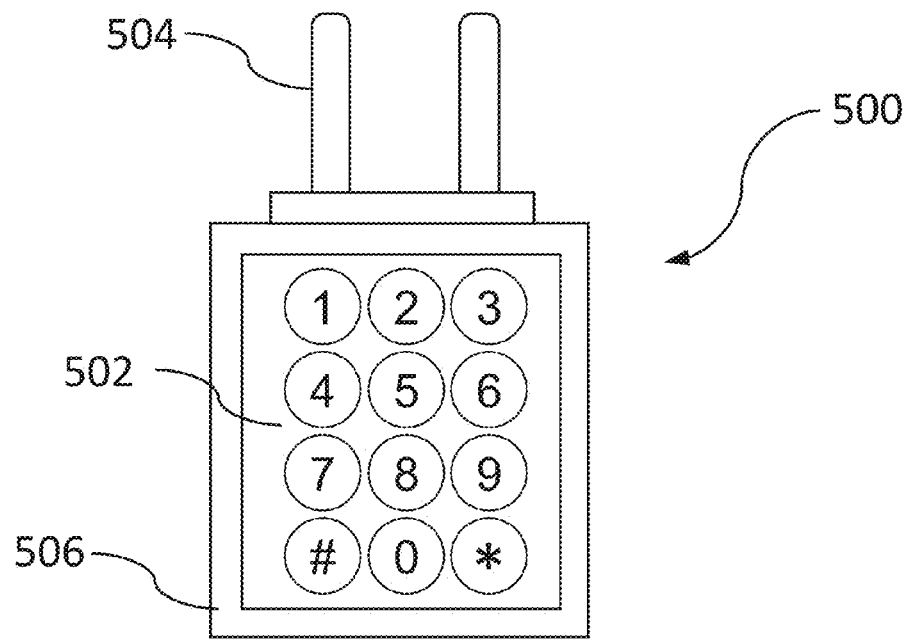
FIG. 5A is an exemplary view of another mobile communication device battery charger.
Figure 5B:
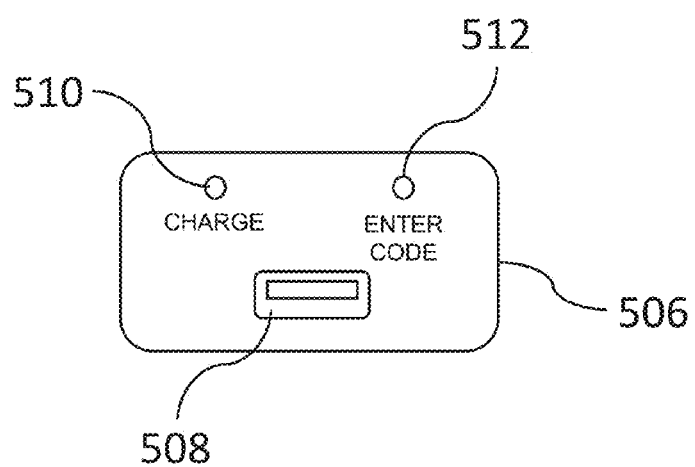
FIG. 5B is another exemplary view of another mobile communication device battery charger.

In exemplary FIGS. 5A and 5B, another secure mobile device charger 500 may be shown. Similar to that shown in exemplary FIGS. 1A and 1B, charger 500 may include any of a variety of components. In particular security measure input area 502 may be any type of security measure input device. In the exemplary embodiments shown in FIGS. 5A and 5B, security measure input device 502 may be a keypad. In this exemplary embodiment, a passcode or personal identification number may be entered to activate charger 500. Alternatively, security measure input device 502 may be a pattern recognition tool that allows a user to draw or swipe a pattern to determine if it matches a preselected or authorized pattern. In still other exemplary embodiments, any other security measure input device 502 may be used as desired.

In still other exemplary embodiments, a secure mobile device charger, such as charger 100, may be used in a variety of environments and circumstances. In one example, charger 100 may be a personal use device. In such embodiments, a user may assign any desired security measure, such as biometric fingerprint data, to the charger and may be the only authorized user of charger 100. In further examples, charger 100 may have any number of authorized users that can input biometric data or other data in order to access the capabilities of charger 100. In other examples, charger 100 may be associated with a payment portal. In such examples a user may deposit money into a payment portal associated with charger 100. The payment portal may then prompt the user to enter biometric data, such as a fingerprint, on a sensor associated with the payment portal. This information may then be transmitted or otherwise shared with the charger 100 so that, upon payment of the appropriate funds, charger 100 can be activated by the paying user and authorized use of charger 100 may take place. Such an exemplary embodiment may allow access to any of a variety of desired users and may prevent undesired or unauthorized access. Further, it may be appreciated that, as in other examples described herein, any desired security measure or measures may be used alone, or in combination.

The foregoing description and accompanying figures illustrate the principles, embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A secure mobile device charging apparatus, comprising:
   a body housing battery charging elements;
   a power connector;
   a mobile device connector;
   a biometric sensor that reads biometric input data; and
   a switch that prevents unauthorized battery charging from the mobile device connector;
   wherein the body housing battery charging elements is coupled to a power source by the power connector and a mobile device is coupled to the body housing battery charging elements with the mobile device connector and, following the coupling of mobile communication device with the body housing battery charging elements, the biometric sensor is activated to receive a biometric input.

2. The secure mobile device charging apparatus of claim 1, further comprising a processor that compares biometric data inputted into the biometric sensor with authorized biometric data stored in a memory.

3. The secure mobile device charging apparatus of claim 1, wherein the processor determines if a predetermined amount of time has passed during battery charging from the mobile device connector when the mobile device is connected to the body via the mobile device connector.

4. The secure mobile device charging apparatus of claim 1, further comprising at least one indicator that provides a status.

5. The secure mobile device charging apparatus of claim 4, wherein the at least one indicator indicates authorized or unauthorized access.

6. The secure mobile device charging apparatus of claim 1, wherein the power connector is a pair of prongs.

7. The secure mobile device charging apparatus of claim 1, wherein the power connector is a cord.

8. The secure mobile device charging apparatus of claim 1, wherein the mobile device connector is a USB port.

9. A system for charging a mobile communication device, comprising:
   a mobile communication device;
   a power source;
   a cord; and
   a mobile communication device charger, the mobile communication device charger comprising:
      a body housing battery charging elements;
      a power connector;
      a mobile device connector;
      a biometric sensor that reads biometric input data; and
      a switch that prevents unauthorized battery charging from the mobile device connector;
   wherein the mobile communication device charger is coupled to the power source and the mobile communication device is coupled to the mobile communication device charger with the cord and, following the coupling of the mobile communication device with the mobile communication device charger, the biometric sensor is activated to receive a biometric input.

10. A system for charging a mobile communication device of claim 9, further comprising a comparison made by a processor between the biometric input and authorized biometric data stored in a memory that determines a charging status of the mobile communication device charger.

\* \* \* \* \*